United States Patent [19]

Ritter

[11] 4,296,049

[45] Oct. 20, 1981

[54] DISTRIBUTOR FOR WASHING FLUID IN A SCRUBBER OR STRIPPER

[75] Inventor: Horst Ritter, Essen, Fed. Rep. of Germany

[73] Assignee: Dr. C. Otto & Comp. G.m.b.H., Bochum, Fed. Rep. of Germany

[21] Appl. No.: 139,504

[22] Filed: Apr. 11, 1980

[30] Foreign Application Priority Data

Apr. 24, 1979 [DE] Fed. Rep. of Germany ....... 2916462

[51] Int. Cl.³ .............................................. B01F 3/04
[52] U.S. Cl. ........................................ 261/111; 55/94; 239/498; 261/21; 261/114 R; 261/DIG. 9
[58] Field of Search ........... 261/110, 111, 113, 114 R, 261/114 JP, 21, 119 R, 125, DIG. 9; 239/498; 55/93, 94

[56] References Cited

U.S. PATENT DOCUMENTS

| | | | |
|---|---|---|---|
| 2,550,456 | 4/1951 | De Flon | 239/498 |
| 2,568,875 | 9/1951 | Wethly et al. | 261/111 |
| 2,639,947 | 5/1953 | Tramm et al. | 261/111 X |
| 2,712,962 | 7/1955 | Goddard | 239/498 |
| 2,772,081 | 11/1956 | Hibshman et al. | 261/114 JP |
| 3,051,397 | 8/1962 | Hanson | 239/498 X |
| 4,099,675 | 7/1978 | Wohler et al. | 261/111 X |
| 4,159,291 | 6/1979 | Bruckert et al. | 261/114 R |
| 4,179,487 | 12/1979 | Chekhov et al. | 261/114 R |
| 4,199,537 | 4/1980 | Zardi et al. | 261/110 X |

FOREIGN PATENT DOCUMENTS

638125 11/1936 Fed. Rep. of Germany ...... 261/111

*Primary Examiner*—Richard L. Chiesa
*Attorney, Agent, or Firm*—Thomas H. Murray; Clifford A. Poff

[57] ABSTRACT

Washing fluid is distributed in a scrubber or a stripper to treat a countercurrent gaseous or vaporous stream by spigots receiving fluid from a tray for discharge onto spray pipes underneath a nozzle at the end of the spigot. A casing surrounds the spigot in a concentrically-spaced relation to a point where slots in the spigot discharge fluid onto a spray plate carried on the lower end of the spigot above the nozzle. The spray plate on the spigot includes a base section with a slotted edge section having some of the slotted portions bent upwardly and others bent downwardly while others are completely removed. The base section supports downwardly-extending fingers that extend into space. A frame carried by the casing supports an upper and smaller spray plate above a lower and larger spray plate all beneath the nozzle in the spigot. The upper and lower spray plates each have upwardly- and downwardly-bent edge portions carried by a base plate.

8 Claims, 5 Drawing Figures

DISTRIBUTOR FOR WASHING FLUID IN A SCRUBBER OR STRIPPER

BACKGROUND OF THE INVENTION

This invention relates to an apparatus to distribute a downward flow of washing fluid in a scrubber or a stripper for treating a countercurrent gaseous or vaporous stream in which distributing trays have spigots extending downwardly therefrom and apertures to conduct the upward flow of a gaseous or vaporous stream permeating at a level above the level of fluid on the tray.

It is known in the art to employ apparatus for distributing washing fluid in a scrubber having fittings such as packing members or stacks of members made of metal mesh. The system employed for distributing the washing fluid generally consists of nozzles, channels or spray plates. The washing fluid is directed to flow through vertically-adjustable overflow slots into spigots carried by distribution trays so that the fluid falls on spray plates underneath the spigots. The fall height for the washing fluid between the spigot overflow and the spray plate is sufficient to produce a uniform sprinkle of washing fluid across the cross section of the scrubber. Known forms of such devices are suitable for distributing an exact predetermined quantity of fluid over the cross section of the scrubber. However, when the amount of fluid varies to a considerable extent, e.g., double or quadruple, within a given period of time, the known distribution trays are unsuitable for uniform distribution of the fluid in the scrubber.

SUMMARY OF THE INVENTION

The present invention provides a solution to the problem of constructing an apparatus for distributing washing fluid over fittings of a scrubber or a distributor such that the fluid is uniformly distributed even if the supply of fluid fluctuates considerably.

It is therefore an object of the present invention to provide apparatus to distribute washing fluid in a scrubber or stripper wherein distribution of the fluid is uniform over between 20% and 100% of the cross section of the scrubber or stripper.

According to the present invention, improvements to known forms of apparatus to distribute washing fluid are provided wherein below the distribution trays, spigots are concentrically surrounded by a casing at a spaced distance with each spigot having a nozzle with a large cross section at its bottom end and one, preferably two, oppositely-disposed openings or slots for discharging washing fluid or located at a point above the nozzle in the neighborhood of the casing. A fluid distributing means includes a distribution system underneath the nozzles and another distribution system above the nozzles on a portion of the spigot which projects from the casing.

More particularly, according to the present invention, there is provided an apparatus to distribute a downward flow of washing fluid in a scrubber or a stripper for treating a countercurrent gaseous or vaporous stream, the apparatus including the combination of distributing trays each having an aperture for the upward flow of the gaseous or vaporous stream, the aperture terminating at an elevation above the level of washing fluid contained by the tray thereof, a spigot extending downwardly from each tray, each spigot including a liquid discharge nozzle at the lower end thereof and at least one fluid discharge opening thereabove, a casing surrounding each spigot in a concentrically-spaced relation, and fluid distributing means disposed underneath each nozzle of a spigot and disposed above the nozzle on a portion of the spigot to project beyond the casing.

These features and advantages of the present invention as well as others will be more fully understood when the following description is read in light of the accompanying drawings illustrating one embodiment of the present invention, wherein.

Figure 1:
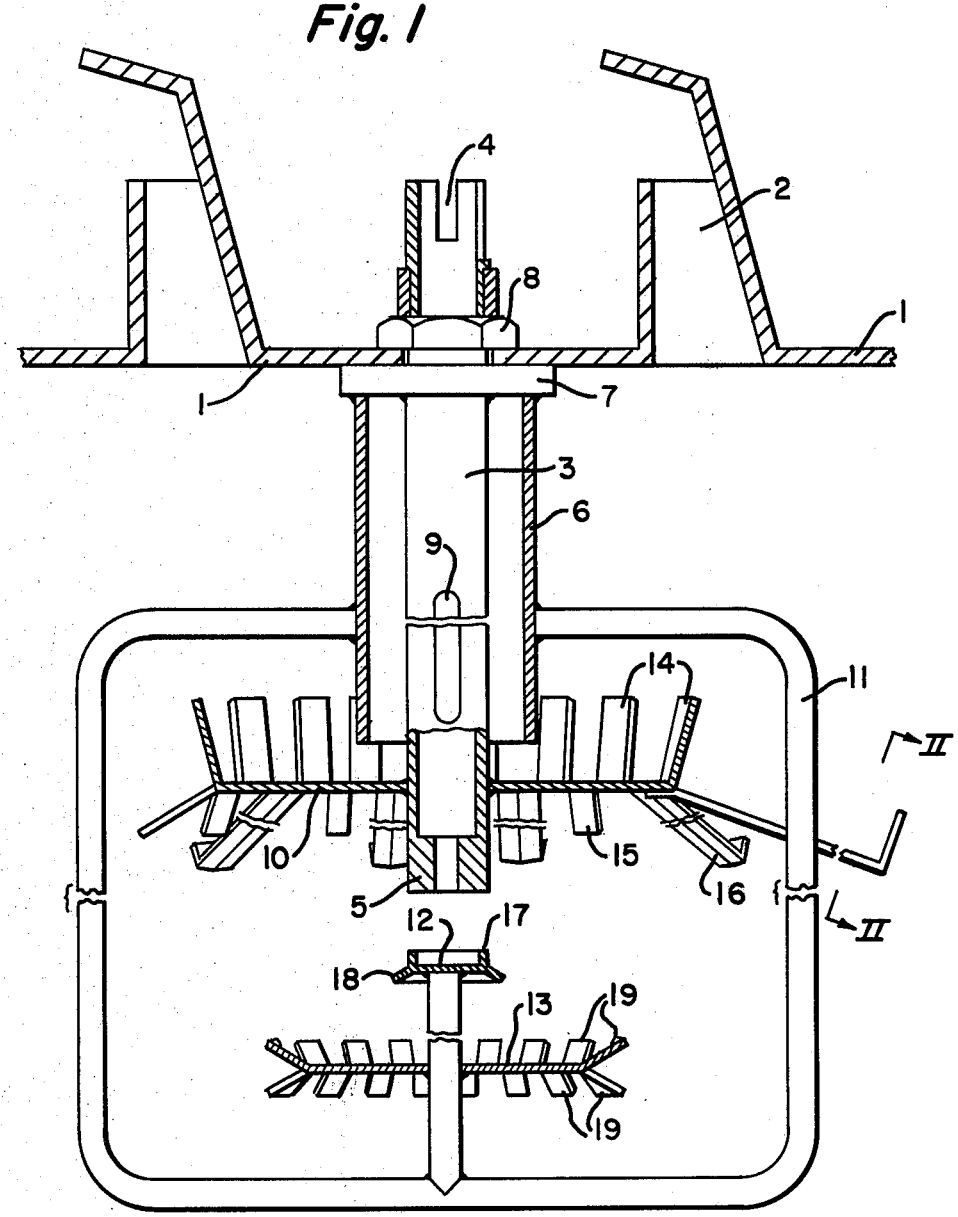
FIG. 1 is an elevational view, in section, of the distribution apparatus according to the present invention.

FIG. 1 illustrates the arrangement of parts forming the apparatus to distribute a downward flow of washing fluid in a scrubber or a stripper for treating a countercurrent gaseous or vaporous stream. The distribution apparatus is secured in a conventional manner to a distribution tray 1 of a scrubber or stripper. The tray has apertures 2 for the upward flow of a gas or vapor in the scrubber or stripper. Washing fluid, such as water, collects on the tray where it enters a spigot 3. The top end of the spigot has vertically-adjustable overflow slots 4. There is a large diameter nozzle 5 secured to the bottom of the spigot. A casing 6 concentrically surrounds the spigot at an outwardly-spaced distance. The casing is welded to a plate 7 to which the spigot is also secured. The spigot is, in turn, secured to the distribution tray 1 by a nut 8 which is passed onto threads formed on the upper portion of the spigot. The spigot projects downwardly beyond the casing 6 and near the bottom end of the casing, the spigot is provided with a discharge passageway for washing fluid, preferably in the form of two diametrically-disposed slots 9. A spray plate 10 is secured to the end of the spigot which projects beyond the casing 6. A frame-like holder 11 is secured to the casing 6. The holder 11 carries two additional spray plates, namely a smaller diameter upper plate 12 and a larger diameter lower plate 13, both of which are supported below nozzle 5 by a vertical post member forming part of the holder.

Figure 3:
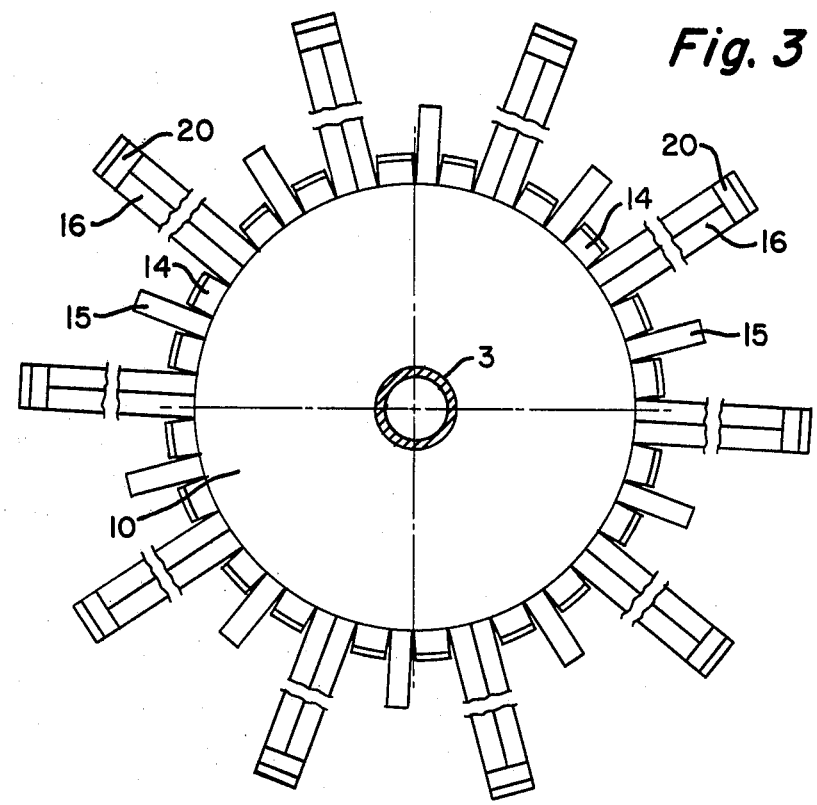
FIG. 3 is a plan view of a fluid distributing member forming part of the apparatus shown in FIG. 1.

FIG. 3 illustrates a plan view of the spray plate 10 which is secured to the spigot. The spray plate 10 includes a trough or base and an edge section with slots at regular intervals extending to the base. Some of the slotted edge portions are bent at an angle downwardly; whereas others of the slotted edge portions are completely removed. Distribution fingers extending far into space are attached to the base at the places from which the slotted portions have been removed. In FIG. 3, the downwardly-bent edge portions are identified by reference numeral 15 and distribution fingers are identified by reference numeral 16. Edge portions 15 alternate between each pair of untouched upwardly-bent edge portions 14.

Figure 2:
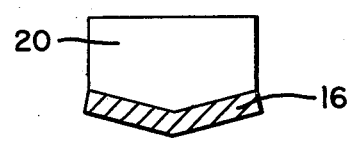
FIG. 2 is a sectional view taken along line II—II of FIG. 1.

FIG. 2 illustrates the cross-sectional configuration of each of the fingers 16. These fingers have a channel-shaped body portion extending to an upwardly-bent edge 20.

Figure 4:
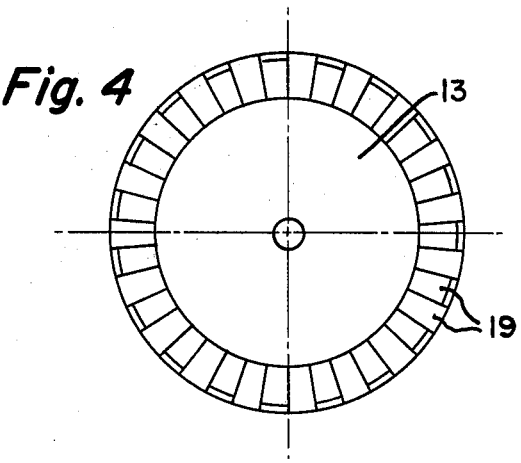
FIG. 4 is a plan view of another fluid distributing member forming part of the apparatus shown in FIG. 1.
Figure 5:
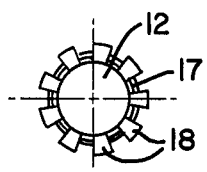
FIG. 5 is a plan view of still another distributing member forming part of the apparatus shown in FIG. 1.

FIGS. 1, 4 and 5 illustrate the construction of spray plates 12 and 13 which are disposed concentrically one below the other at a distance underneath nozzle 5. Each of the spray plates includes a trough or base having a slotted edge portion. Alternate segments, formed by the slots of the edge portion, are bent downwardly at an angle. The upper and smaller spray plate 12 has upwardly-bent edge portions 17 extending upwardly almost vertical; whereas the downwardly-bent edge portions extend downwardly at a more oblique angle. The edge portions 19 of the lower and larger spray plate 13 are bent at substantially the same angle, upwardly and downwardly.

In the operation of the apparatus, washing fluid for distribution in a scrubber or stripper flows downwardly through spigots 3 from slots 4. The nozzle 5 at the lower end of the spigot centers the jet stream of fluid to fall onto the spray plate 12 located underneath the nozzle. The jet stream of fluid is broken up and falls in the form of a uniform sprinkle onto scrubber or stripper fittings which are arranged underneath the falling sprinkle of fluid. When the supply of fluid is reduced, some fluid drips from spray plate 12 onto spray plate 13. Spray plate 13 with its larger diameter uniformly distributes the small quantity of fluid which it receives.

When very large amounts of washing fluid, e.g., several times the desired or designated amounts, the fluid accumulates in spigot 3 and above nozzle 5. Some of the fluid passes from the spigot through slots 9 over the nozzle 5 onto spray plate 10. The bent edge portions 15 and the long fingers 16 of the spray plate 10 distribute the fluid over the central and outer parts of the spray region. Tests have shown that very small or very large amounts of washing fluid (5 to 6 times the smaller amount) can be uniformly distributed over scrubber fittings by the apparatus of the present invention.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus to distribute a downward flow of washing fluid in a scrubber or a stripper for treating a countercurrent gaseous or vaporous stream, said apparatus including the combination of a plurality of distributing trays each having an aperture for the upward flow of said stream, said aperture terminating at an elevation above the level of washing fluid contained by the tray thereof, a spigot extending above a tray and having a liquid receiving opening between the tray and the aperture thereabove, each spigot extending downwardly from a tray and including a liquid discharge nozzle at a lower end thereof and at least one fluid discharge opening thereabove, means for securing said spigot to a tray, a casing surrounding each spigot in a concentrically-spaced relation, and two fluid distributing members, one disposed underneath said nozzle of a spigot and the other member disposed between the nozzle and said fluid discharge opening on a portion of the spigot to project beyond said casing.

2. The apparatus according to claim 1 wherein each spigot has diametrically-opposed slotted openings, each defining a fluid discharge opening.

3. The apparatus according to claim 1 wherein the fluid distributing member disposed above the nozzle on each spigot includes a spray plate with a base section extending to a peripheral edge section having slots at regular intervals forming edge portions, some edge portions being bent upwardly at an angle, others being bent downwardly at an angle and others being removed such that a downwardly-bent edge portion and gap formed by the removed edge portion occur alternately between the edge portions bent upwardly.

4. The apparatus according to claim 3 further including a distribution finger secured to the bottom of said spray plate to extend downwardly therefrom at an angle into space.

5. The apparatus according to claim 4 wherein said distribution finger includes a channel and an upwardly-bent edge at the extended end in space.

6. The apparatus according to claim 1 or 3 wherein the fluid distributing member underneath said nozzle includes two superimposed spray plates having different diameters.

7. The apparatus according to claim 1 or 3 wherein the fluid distributing member underneath said nozzle includes a large spray plate having a base section and a slotted edge section forming alternate upwardly- and downwardly-bent edge parts, and a small spray plate disposed above said large spray plate.

8. The apparatus according to claim 1 further including a support frame secured to the casing surrounding said spigot for supporting said fluid distributing member disposed underneath said nozzle.

* * * * *